United States Patent [19]

Tuda et al.

[11] 4,119,015

[45] Oct. 10, 1978

[54] BILLET MILLING EQUIPMENT

[75] Inventors: Goro Tuda, Kobe; Yoshihisa Sawada, Nishinomiya; Yasuhiro Mugitani, Kobe, all of Japan

[73] Assignee: Kobe Steel, Limited, Kobe, Japan

[21] Appl. No.: 746,894

[22] Filed: Dec. 2, 1976

[30] Foreign Application Priority Data

Dec. 5, 1975 [JP] Japan .................................. 50-145664
Jul. 14, 1976 [JP] Japan .................................. 51-84357

[51] Int. Cl.$^2$ .......................... B23C 1/12; B23C 1/00; B24B 7/00
[52] U.S. Cl. ...................................... 90/17; 90/15 A; 51/78; 51/80 A
[58] Field of Search ................. 90/18, 15 A, 19, 24 F; 51/78, 80 A, 110, 112

[56] References Cited

U.S. PATENT DOCUMENTS

| | | | |
|---|---|---|---|
| 2,726,579 | 12/1955 | Martellotti | 90/15 A |
| 2,732,771 | 1/1956 | Kerns | 90/18 X |
| 2,925,691 | 2/1960 | Kibbe | 51/78 |
| 3,954,044 | 5/1976 | Ridgway | 90/18 X |
| 3,977,298 | 8/1976 | Linsinger | 51/78 X |

*Primary Examiner*—Harrison L. Hinson
*Attorney, Agent, or Firm*—Oblon, Fisher, Spivak, McClelland & Maier

[57] ABSTRACT

Billet milling equipment including first frames which are laid on a traveling path of a billet, a pair of upper and lower clamping frames which are movable so as to follow a deformation of the billet and which are installed on the first frames, and milling cutter units which normally follow a surface of the billet to be cut in correspondence with the deformation of the billet and which are installed on the clamping frames in a manner to be capable of advancing or retreating relative to the surface to-be-cut. On the basis of a signal from a flaw detector, a milling cutter of the milling cutter unit which is following the deformation of the billet is rotated in pressed contact with the surface to-be-cut of the billet, whereby a flaw is removed by the cutting.

10 Claims, 12 Drawing Figures

BILLET MILLING EQUIPMENT

BACKGROUND OF THE INVENTION

1. Field of the Invention

This invention relates to billet milling equipment for mechanically cutting and removing a flaw on the surface of a billet which is transported after rolling.

2. Description of the Prior Art

Cracks, scars etc. which appear at the steel making stage and during blooming are greatly influential on the quality of a steel material. The removal of such flaws is an important subject in quality control.

Regarding the detection of the flaws of the steel material, automatic flaw detectors devoted to round bars, wire rods and pipe materials have already been developed, and some of them are commercially available. It is the present situation, however, that the detectors rely mainly on visual inspection and have a comparatively small number of automated parts.

On the other hand, the operation of removing the flaws has scarcely been automated with the exception of a scarphing machine for the hot removal in the molten state or some other devices. Hand labors such as the grinding job and the chipping job assume a very large proportion, which causes a serious bottleneck in saving labors in a foundry and in enhancing the productivity. Further, in special jobs, such as the grinding and chipping jobs, with vibration tools carried by hands, there frequently occur occupational diseases ascribable to local vibration troubles, for example, the so-called white wax disease of hands or fingers. The automatic removal of the flaws is important also from the point of preventing such diseases.

SUMMARY OF THE INVENTION

This invention has been made in order to solve the problems described above, and has therefore an object to provide equipment which automatically and efficiently cuts and removes a flaw on a billet being transported after rolling.

A further object is to provide equipment which is applicable also to a curved or deformed billet and which can effectively perform the operation of removing flaws.

According to the present invention billet milling equipment is constructed of first frames which are laid on a traveling path of a billet, a pair of upper and lower clamping frames which are movable so as to follow a deformation of the billet and which are installed on the first frames, and milling cutter units which normally follow a surface to-be-cut of the billet in correspondence with the deformation of the billet and which are installed on the clamping frames in a manner to be capable of advancing and retreating relative to the surface to-be-cut.

The axis of rotation of a milling cutter of the milling cutter unit may normally be perpendicular to the surface to-be-cut of the billet.

The axis of rotation of a milling cutter of the milling cutter unit may normally be parallel to the surface to-be-cut of the billet and can move in the width direction of the surface to-be-cut.

Driving means for bestowing feed on the billet is installed on one of the clamping frames, and driven means pairing with the driving means is disposed on the other clamping frame.

Furthermore, the pair of upper and lower clamping frames are installed on the first frames by cylinder members and are coupled with each other by cylinder members so as to be freely brought near to or away from each other.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

This invention will be described with reference to FIGS. 1 to 7 showing an embodiment thereof.

The billet milling equipment according to this invention is broadly composed of a main frame 2 and a billet milling machine 13 which are installed along the traveling path of a billet 1. The main frame 2 serves to hold the billet milling machine 13 through oil hydraulic lifting cylinders 5 as well as oil hydraulic cushion cylinders 7a, 7b, 7c, 7d as is more fully explained below. The main frame 2 is constructed of two sets of guide rollers 3a, 3b; two sets of lifting cylinders 5; four sets of cushion cylinders 7a–7d; and first frames 4a, 4b. The billet milling machine 13 serves to carry out the feed operation and cutting operation on the billet 1. Billet milling machine 13 is constructed of a pair of upper and lower clamping frames 14a, 14b; two sets of oil hydraulic clamping cylinders 16; two sets of driving roller units 21; two sets of driven roller units 26; and four sets of milling cutter units 28 which are mounted on the respective roller units.

The oil hydraulic lifting cylinder 5 has the head side thereof coupled to an upper part of the first frame 4a and the rod side thereof coupled to the upper clamping frame 14a constituting the billet milling machine 13, through knuckle joints 6a, 6b. The lifting cylinders 5 are vertically advanced or retreated in cooperation with the clamping cylinders 16 by the oil hydraulic operation, to press the billet milling machine 13 against the billet 1 or release the same therefrom.

Figure 1:
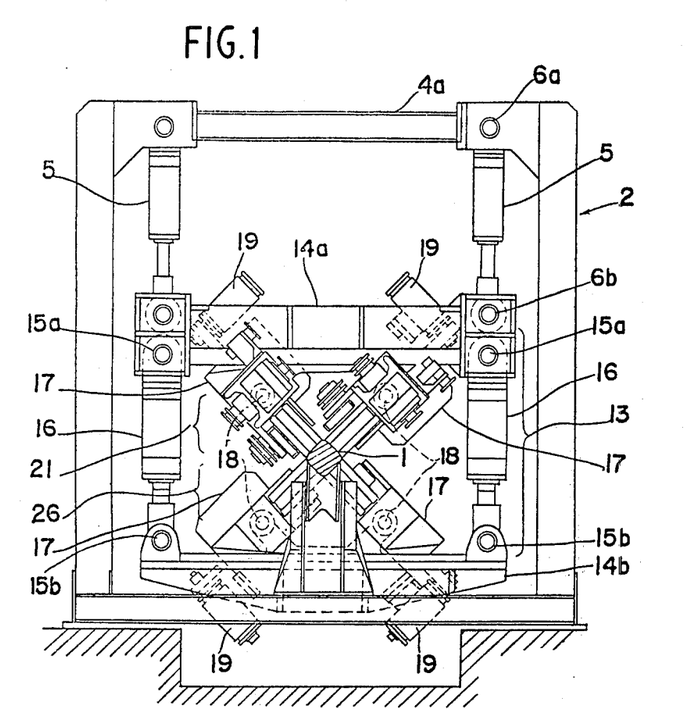
FIG. 1 is a front view of an embodiment of the billet milling equipment according to this invention.
Figure 2:
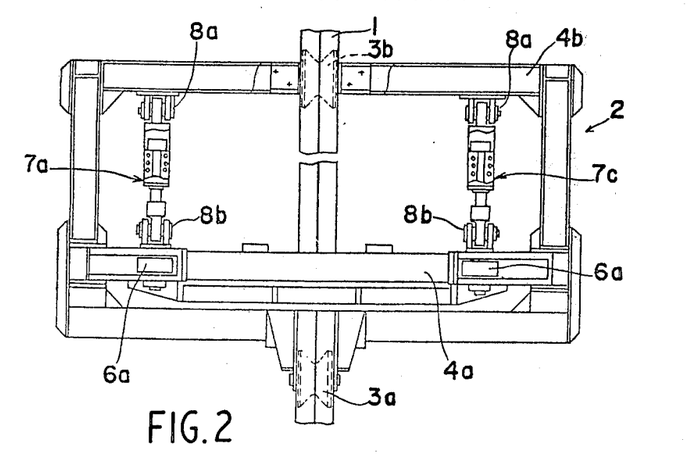
FIG. 2 is a plan view of the embodiment.
Figure 3:
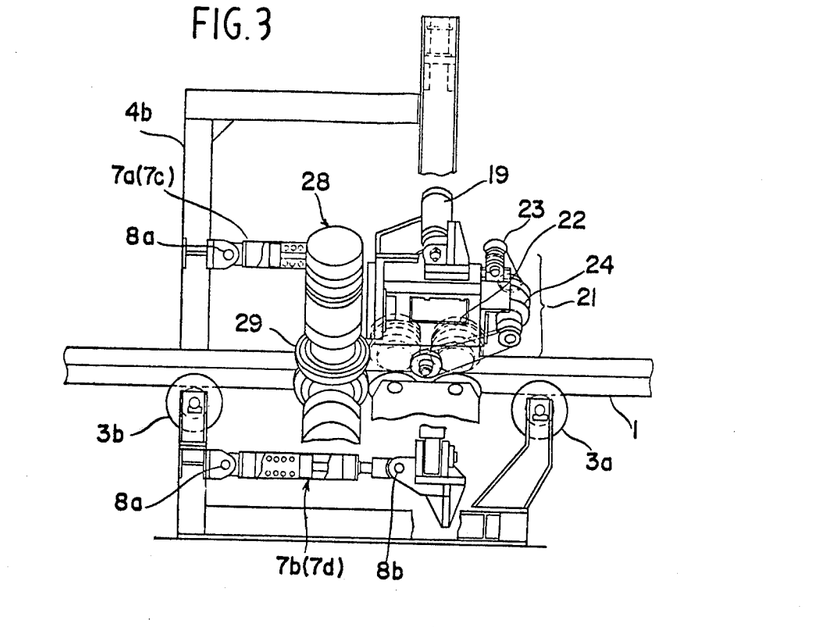
FIG. 3 is a side view thereof.
Figure 4:
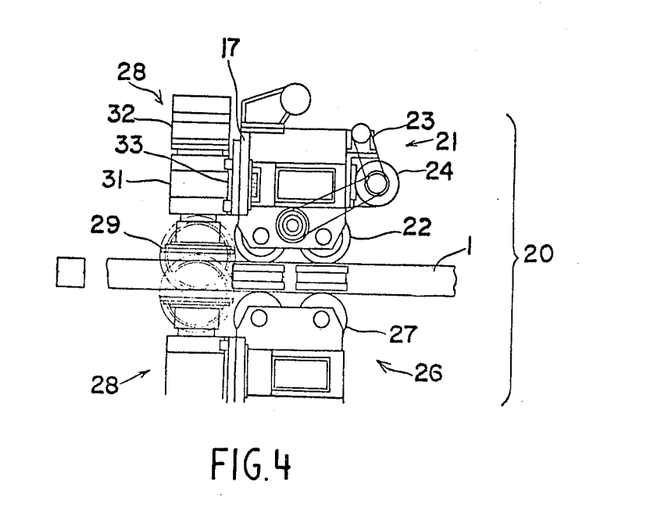
FIG. 4 is a partial perspective view thereof.
Figure 5:
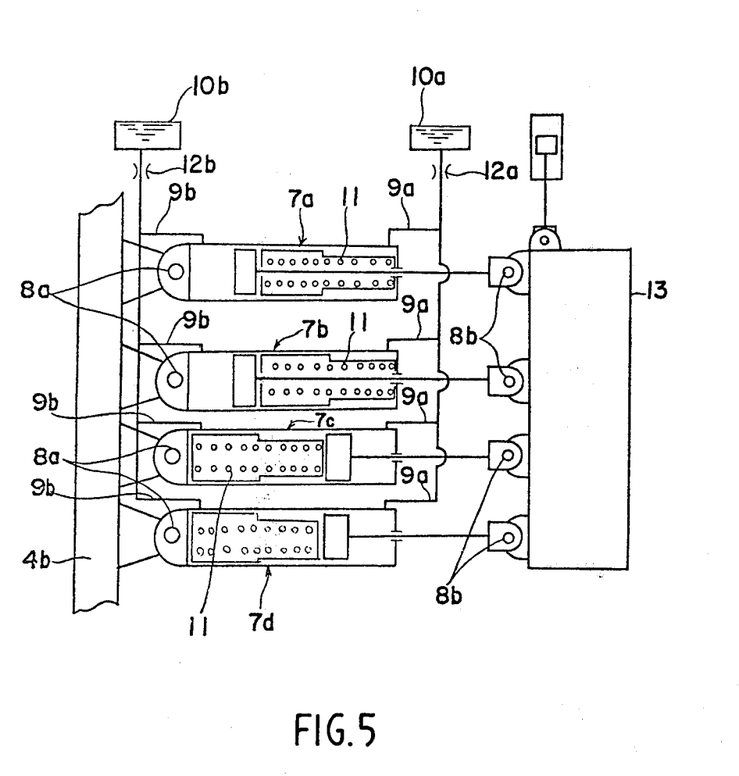
FIG. 5 is an explanatory view showing the construction of an oil hydraulic cushion cylinder.
Figure 6:
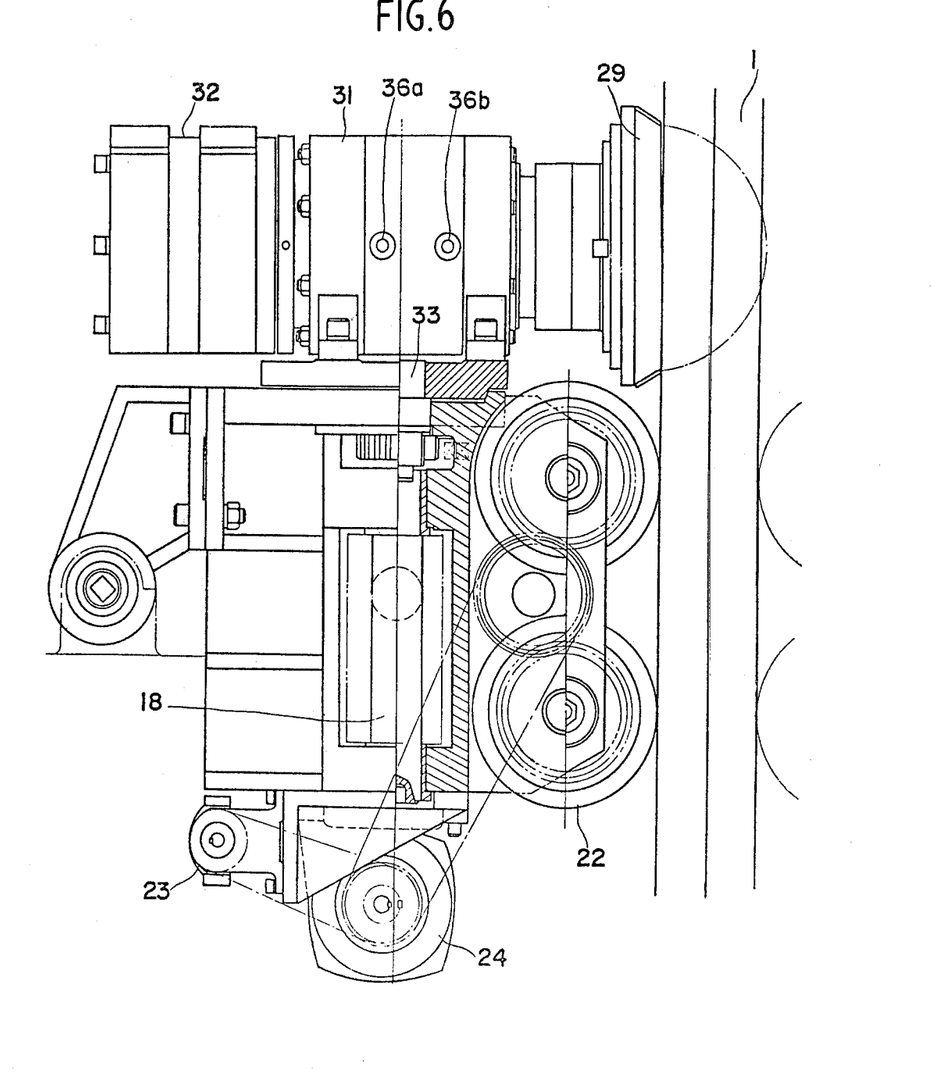
FIG. 6 is an enlarged side view of a roller unit and a milling cutter unit.
Figure 7:
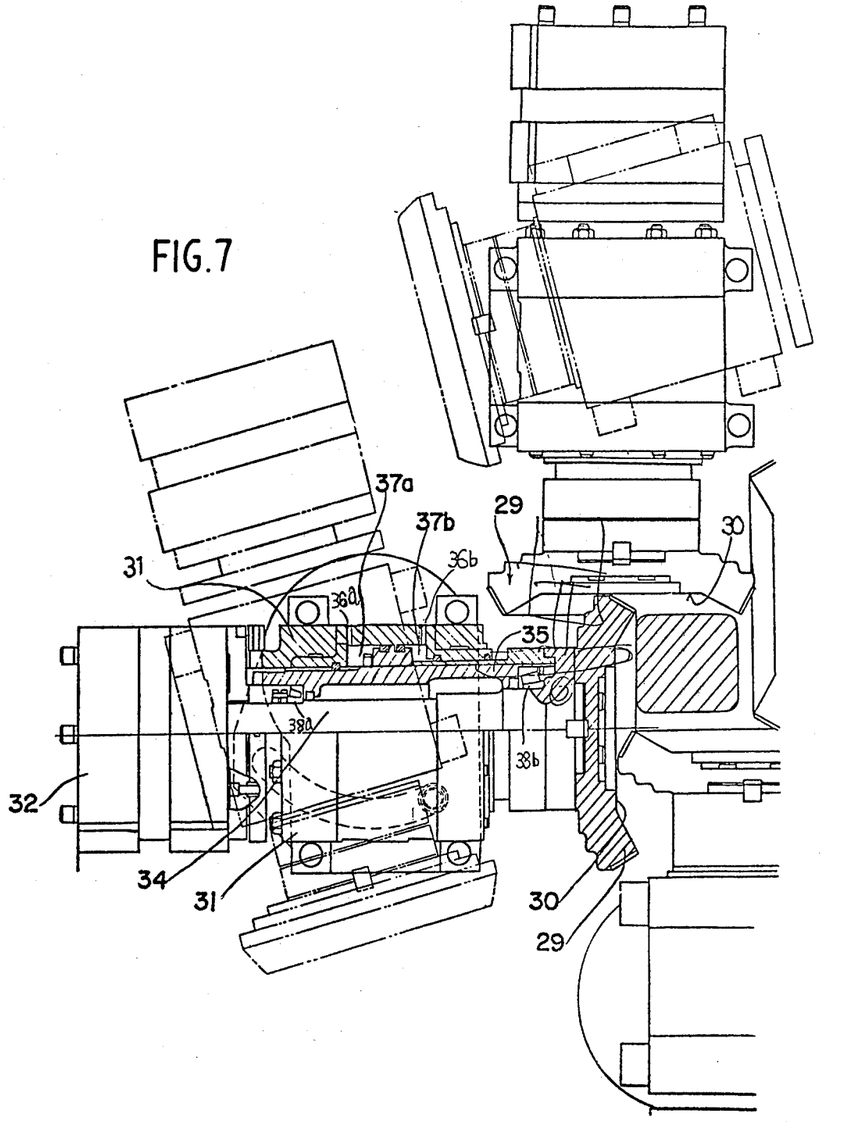
FIG. 7 is an enlarged sectional view of the milling cutter unit.

The cushion cylinders 7a–7d have their head sides turnably coupled to the first frame 4b on the billet exit side by knuckle joints 8a, and have their rod sides turnably coupled to the upper clamping frame 14a and the lower clamping frame 14b by knuckle joints 8b. As shown in FIG. 5, oil hydraulic pipelines 9a on the respective rod sides and oil hydraulic pipelines 9b on the respective head sides are respectively made common. A fixed amount of oil is confined on both sides. At the clamping of the clamping cylinders 16, the cushion cylinders follow a curvature of the billet 1 but prevent the billet milling machine 13 from moving in the axial direction of the billet 1.

In the above case, likewise to the lifting cylinders 5, the cushion cylinders are coupled with the billet milling machine 13 through the knuckle joints 8b. Therefore, even when the billet milling machine 13 is deformed following the billet 1, no unreasonable force acts on the cushion cylinders 7a–7d.

During the period during which the fore end of the billet 1 passes through the guide roller 3a, located in front of the billet milling machine 13, and enters into the billet milling machine 13, i.e., in the so-called release state in which the upper clamping frame 14a is ascending by means of the lifting cylinders 5 and the clamping cylinders 16, the billet milling machine 13 is held vertical by springs 11 which are contained in the cushion cylinders 7a–7d so as to exert repulsive forces in different directions. A volume change of the oil caused by, for example, the expansion or contraction of the oil due to a temperature difference or the leakage of the oil is absorbed by tanks 10a, 10b and orifices 12a, 12b. When a feed and cutting stage of work begins upon completion of the clamping, the billet milling machine 13 tilts due to a change in the feed speed of the billet 1, and a force in the axial direction of the billet 1 arises. Since, however, the fixed oil pressures are hermetically kept on the rod sides and head sides of the four sets of cylinders 7a – 7b, movement of the centroid of the billet milling machine is prevented.

The upper and lower clamping frames 14a, 14b hold a roller unit 20, to be described later, and the milling cutter units 28 at predetermined positions relative to the billet 1, and clamp the billet 1 through the oil hydraulic clamping cylinders 16. As stated above, the upper clamping frame 14a has the ends supported by the lifting cylinders 5 through knuckle joints 6b. On the frame 14a, there are held two sets of milling cutter units 28 and driving roller units 21 each of which consists of two driving rollers 22 as well as a driving motor 23 therefor, etc. On the lower clamping frame 14b, there are held two sets of milling cutter units 28 and driven roller units 26 each of which consists of two driven rollers 27 having no driving motor 23, etc. Both ends of the clamping frames 14a, 14b are coupled through the clamping cylinders 16.

Each set which consists of the milling cutter unit 28 and the driving roller unit 21 or which consists of the milling cutter unit 28 and the two driven rollers 27 having no driving motor is arranged on a bracket 17. Bracket 17 is rockably coupled with the clamping frame 14a or 14b through an attitude holding device 19 and a pin 18 which are fixed on the bracket 17. During the cutting, therefore, a milling cutter 29 always holds a position perpendicular to the plane of the billet 1 even if the billet is deformed. The clamping cylinder 16 is hydraulically driven. The head side of the clamping cylinder 16 is coupled with the upper clamping frame 14a and the rod side with the lower clamping frame 14b through the knuckle joints 15a and 15b provided at both ends of the cylinder 16, respectively. While holding rigidly between the billet 1 and the milling cutters 29, the clamping cylinders 16 secure a predetermined feed speed overcoming a cutting resistance, so that they clamp the billet 1 by sufficient clamping forces through the driving rollers 22 and the driven rollers 27. Until the fore end of the billet 1 enters into the billet milling machine 13 after passing through the guide roller 3a located in front of the billet milling machine 13, the clamping cylinders 16 control the positions of their pistons in cooperation with the lifting cylinders 5 so as to hold the billet milling machine 13 in the state (position) in which the billet 1 is easy to enter. That is, the pistons are moved to the terminal ends of their strokes, and a sufficient spacing is established between the two clamping frames 14a and 14b and is held so as to allow the billet 1 to pass freely.

When the fore end of the billet 1 arrives at the roller unit 20 after passing through the guide roller 3a located in front of the billet milling machine 13, the clamping cylinders 16 are actuated by a detector, not shown. After a number of predetermined strokes, the clamping is completed and the two clamping cylinders 16 are integrally coupled by a pipeline, not shown. Thus, even in the case where the two clamping frames 14a and 14b become unparallel to each other due to deformation of the billet 1 (in the case where the billet has no deformation and where its section is square or rhombic, the two clamping frames 14a and 14b are parallel to each other), the necessary clamping forces can be secured at all times. After the billet 1 has passed, the pistons are again moved to the terminal ends of the strokes so as to make ready for the supply of a new billet.

Overcoming the cutting resistances of the milling cutter units 28, the roller unit 20 endows the billet 1 with the predetermined feed speed. Roller unit 20 is made up of the four driving rollers 22, the two driving hydraulic motors 23, and the four driven rollers 27. The four driven rollers 27 have no driving device, and the remaining four rollers 22 opposing thereto are coupled with the driving hydraulic motors 23 and actually execute the feed operation by exploiting the frictional forces between the surface of the billet and the surfaces of the driving rollers. The clamping forces for the rollers 22, 27 are generated by the clamping cylinders 16, as stated previously, and the turning forces of the rollers 22 are transmitted through reduction gears 24 from the oil hydraulic motors (driving motors) 23.

The cutter unit 28 is made up of the milling cutter 29, a cylinder 31, and a driving hydraulic motor 32. The milling cutter unit 28 has the cylinder 31 mounted on a side part of the body of the roller unit 20 in such a manner that it can swivel by a shaft 33. The swivel of the milling cutter unit 28 is conducted in order to facilitate the replacement of the milling cutter 29. Except during replacement of the cutter, the milling cutter unit 28 is fixed to the roller unit 20 by actuating a locking device, not shown. The state of the swiveled cutter unit 28 is shown by chain lines in FIG. 7. A hollow sleeve 35 is fitted in the cylinder 31. Pressure chambers 37a, 37b are defined between the cylinder 31 and the sleeve 35, and pressure ports 36a, 36b communicating with the respective pressure chambers 37a, 37b are provided. Further, a main spindle 34 is penetratingly installed in the sleeve 35 through bearings 38a, 38b. The milling cutter 29 is detachably secured to one end of the main spindle 34, and the driving hydraulic motor 32 is coupled to the other end thereof. By supplying oil pressure from the pressure port 36a of the cylinder 31 to the pressure chamber 37a, the milling cutter unit 28 operates to move the milling cutter 29 to the billet surfaces and to cut the billet by applying a necessary pressing force thereto; or by supplying the oil pressure from the pressure port 36b to the pressure chamber 37b, it operates to separate the milling cutter 29 from the billet surface.

Accordingly, on the basis of a flaw signal which is generated due to the presence of a flaw from a flaw detector, not shown, each of the milling cutter units 28 is operated to move the milling cutter 29 to the billet surface, and singly or simultaneously actuated to take away the flaw by cutting. A concave portion 30 is provided at the central part of each milling cutter 29, so that the cutter 29 can turn without being hindered by any other cutter 29.

In the equipment described above, the main spindle of the milling cutter 29 provided in the milling cutter unit 28 advances or retreats in such a manner that is normally perpendicular to the surface to-be-cut of the billet 1. An alternative construction may be adopted wherein the milling cutter unit 28 is installed on the clamping frame rockably so that the cutter main spindle may be normally parallel to the surface to-be-cut of the billet 1 in order to cope with the deformation thereof, and wherein while keeping the cutter main spindle parallel to the surface to-be-cut, the milling cutter is rotated in pressed contact with the surface to-be-cut, thereby to cut and remove the flaw. In this case, the cutter main spindle is made movable in the width direction of the billet so that the milling cutter may coincide with the flaw at any position in the width direction of the billet. This aspect will be further explained with reference to FIGS. 8 to 11(b).

Figure 8:
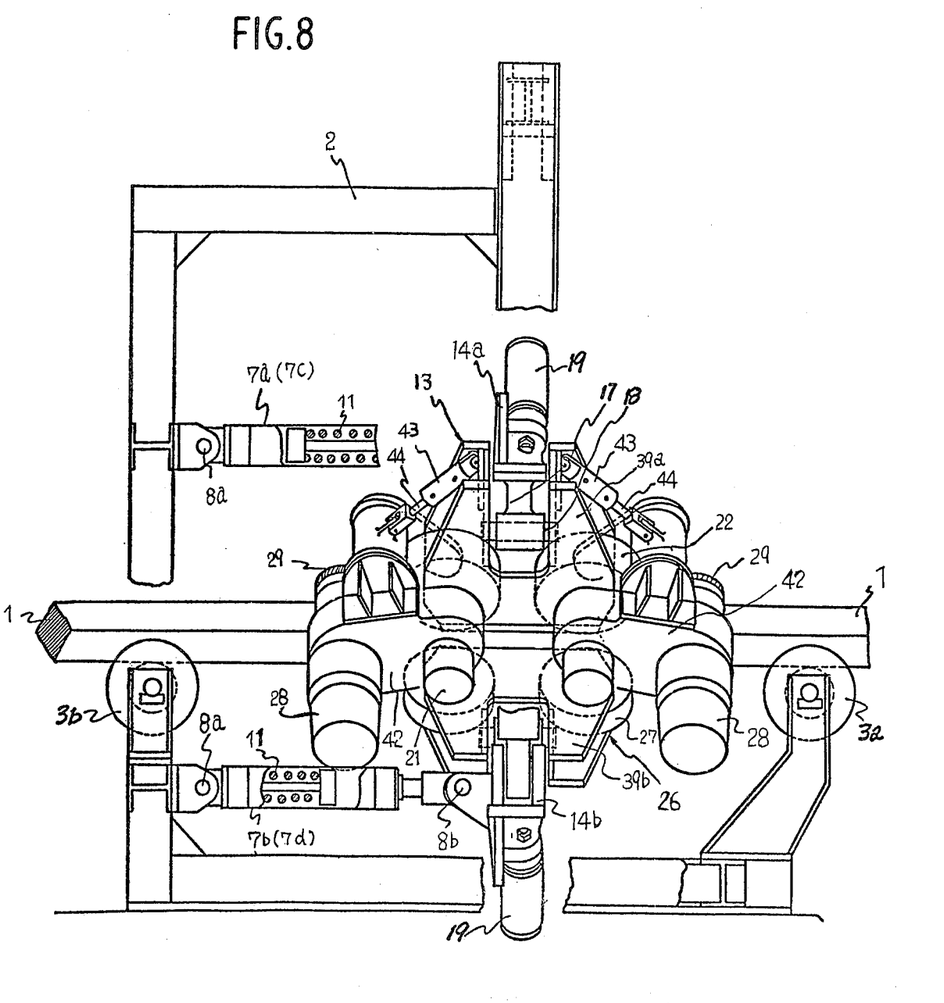
FIG. 8 is a side view of another embodiment of the billet milling equipment according to this invention.
Figure 9:
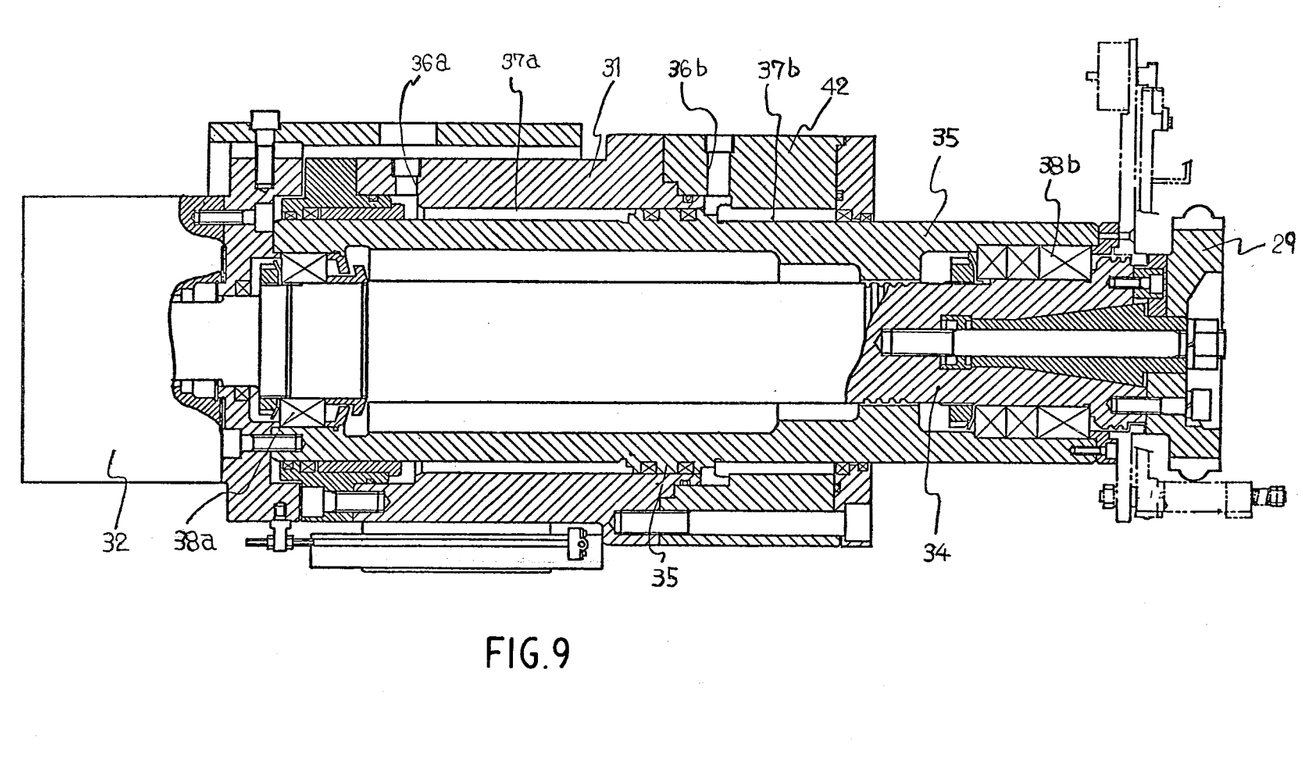
FIG. 9 is an enlarged sectional view of a milling cutter unit in the equipment of FIG. 8.
Figure 10:
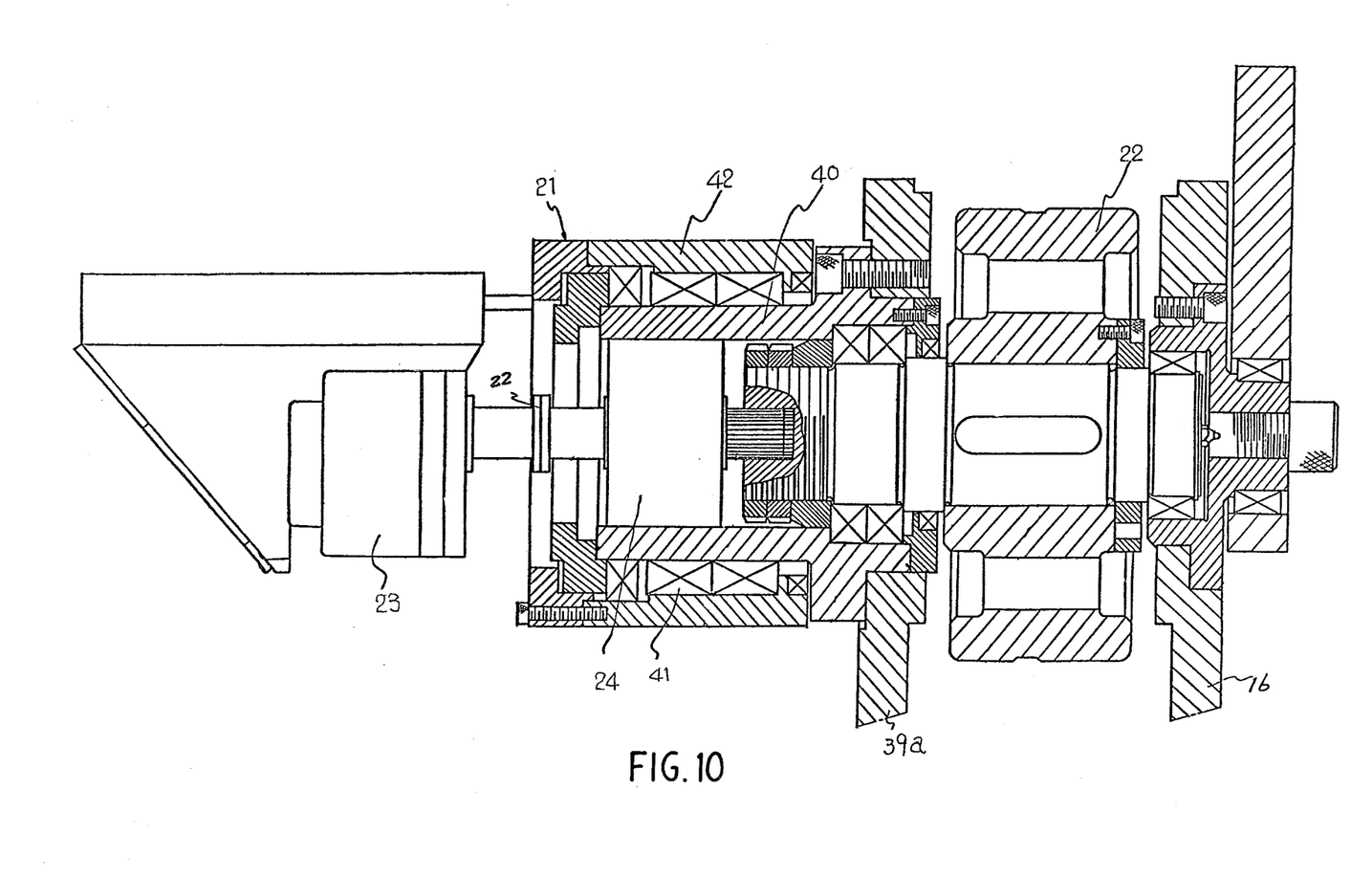
FIG. 10 is an enlarged sectional view of a driving roller unit in the equipment of FIG. 8.
Figure 11A:
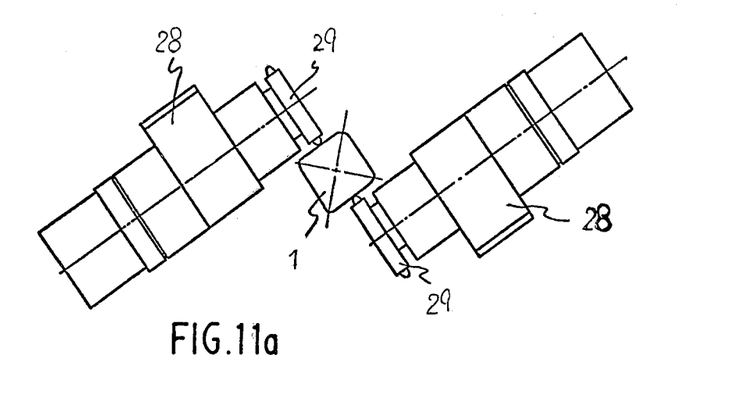
FIGS. 11(a) and 11(b) are views for explaining the arrangements of the milling cutter unit.
Figure 11B:
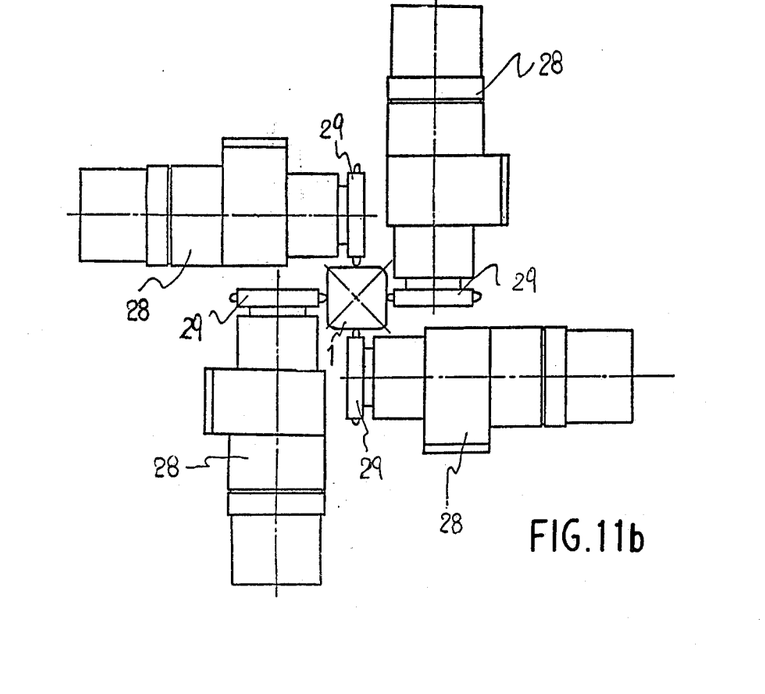

The milling cutter unit 28 is installed in a manner to be rockable about the axis of rotation of the driving roller 22 of the driving roller unit 21. That is, a rocker arm 42 is rockably mounted through a bearing 41 on the outer periphery of a housing 40 secured to a frame 39a of the driving roller unit 21, and a piston rod 44 of a servo cylinder 43 whose one end is pivotally supported on a frame 39b is coupled to the rocker arm 42. The cylinder 31 is secured to the fore end of the rocker arm 42 in parallel with the axis of rotation of the driving roller 22 of the driving roller unit 21. The hollow sleeve 35, which is formed with a protuberance at an intermediate part, is fitted in the cylinder 31, to define the pressure chambers 37a and 37b between the cylinder 31 and the sleeve 35. Pressure ports 36a and 36b communicating with the respective pressure chambers 37a and 37b are provided. The main spindle 34 is penetratingly installed in the sleeve 35 through the bearings 38a and 38b. The milling cutter 29 for cutting and removing the flaw of the billet 1 is detachably secured to one end of the main spindle 34, and the driving hydraulic motor 32 is coupled to the other end thereof. When the billet 1 enters into the billet milling machine 13 and the clamping of the billet by the clamping frames 14a and 14b is completed, the milling cutter unit 28 supplies the oil pressure from the pressure port 36a or 36b of the cylinder 31 to the pressure chamber 37a or 37b on the basis of the signal from the flaw detector, to set the axial position of the milling cutter 29, i.e., to set the cutting position for the surface of the billet 1. Subsequently, the servo cylinder 43 is actuated so as to bestow a predetermined amount of cutting. Thus, the milling cutter unit 28 is rocked about the axis of rotation of the driving roller 22 of the driving roller unit 21, to come near to or go away from the billet surface so as to perform the cutting and removal of the flaw. Accordingly, on the basis of the flaw signal which is generated due to the presence of the flaw from the flaw detector, not shown, the milling cutter units 28 are singly or simultaneously actuated to remove the flaw by the cutting. As shown in FIG. 11(a), the milling cutter units 28 may be arranged so as to cut and remove the flaws from two surfaces of the billet 1. As shown in FIG. 11(b), the milling cutter units 28 may well be mounted on the driving roller units and driven roller units of the upper and lower clamping frames 14a and 14b so as to simultaneously cut four surfaces of the billet. Further, it is possible that, as shown in FIG. 8, the milling cutter units 28 are provided on both the sides of the traveling direction of the billet 1 in a manner to hold the driving roller unit 21 or the driven roller unit 26 therebetween.

Description will now be made of the operation of the billet milling equipment of the above construction.

Before the billet 1 is supplied to the billet milling machine 13 from the flaw detector, not shown, the spacing between the pair of upper and lower clamping frames 14a and 14b of the billet milling machine 13 is made large enough to allow the billet 1 to freely enter thereinto by the operations of the oil hydraulic lifting cylinders 5 and the oil hydraulic clamping cylinders 16 in consideration of the curvature, deformation etc. of the billet 1. The billet milling machine 13 is thus suspended from the frame 4a and stands ready for the supply of the billet 1. When the fore end of the billet 1 arrives at the roller unit 20 through the guide roller 3a located in front of the billet milling machine 13, the pistons of the lifting cylinders 5 are released on the basis of the signal from the detector, not shown. Simultaneously therewith, the clamping cylinders 16 are actuated to fix the billet 1 by means of the driving rollers 22 and the driven rollers 27. Subsequently, the clamping of the billet 1 is completed upon the coupling of the two clamping cylinders 16 by the pipeline. Under this state, the billet milling machine 13 is released from the restraint by the frame 4a and is held at the surfaces to-be-milled of the billet 1 itself. Thereafter, the roller unit 20 operates to move the billet 1 at a fast feed speed. When the flaw signal is issued from the flaw detector, not shown, meantime, the billet feed speed is turned into a predetermined cutting feed speed, and depending on the position of the flaw, the corresponding cutter unit 28 operates and rotates and advances the milling cutter 29 to cut away the flaw of the billet 1. When the flaw signal is stopped, the milling cutter 29 returns to the original position and stops the rotation in correspondence with the stop of the signal, and the feed operation is continued by the roller unit 20.

When the terminal end of the billet 1 arrives at the roller unit 20, the clamping cylinders 16 and the lifting cylinders 5 are actuated again by the signal from the detector, not shown, to release the billet 1 and to reset the billet milling machine 13 to the optimum position for the entry of the billet 1. Then, preparations are made for the supply of the next billet 1.

As apparent from the above description, this invention consists in billet milling equipment wherein while holding a billet milling machine at the surface to-be-milled of a billet itself, it is caused to follow up the billet at all times irrespective of a curvature or deformation of the billet, the billet milling machine being formed in such a way that a pair of upper and lower clamping frames on which a roller unit (or units) for applying a conveying force to the billet and a milling cutter unit (or units) for cutting and removing a surface flaw (flaws) of the billet are installed and disposed so as to freely touch with or separate from the billet, and wherein a milling cutter (or cutters) driven by oil hydraulic pressure, pneumatic pressure, an electric motor or the like is (are) provided so as to cut the surface flaw (flaws) of the billet in one direction to four directions in response to a flaw signal from a flaw detector, whereby the flaw (flaws) is (are) automatically removed. Since the whole billet milling machine on which the milling cutter unit (or units) is (are) installed moves following the deformation of the billet, an inferior cutting ascribable to the shaking of the billet caused by the deformation of the billet can be fully eliminated at the cutting, and the removal of the flaws by the cutting can be automatically carried out at a high efficiency.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Billet milling equipment for cutting and removing a flaw by rotating a milling cutter in pressed contact with a surface to-be-cut of a billet, which comprises:
   first frames forming a traveling path through which said billet passes,
   a pair of upper and lower clamping frames which are moveable so as to follow up a deformation of said billet and which are installed on said first frames,
   a first and second milling cutter unit, which normally follow up the surface to-be-cut of said billet in correspondence with the deformation of said billet, installed on said upper and lower clamping frames, respectively, means for automatically advancing and retreating said first and second milling cutter unit relative to said surface to-be-cut wherein driving means for bestowing feed of said billet are installed on one of said clamping frames, and driven means pairing with and operably connected to said driving means is disposed on the other of said clamping frames and wherein said clamping frames are installed on said first frames by cylinder members.

2. Billet milling equipment according to claim 1, wherein an axis of rotation of a milling cutter of said first and second milling cutter unit is normally perpendicular to said surface to-be-cut of said billet.

3. Billet milling equipment according to claim 1, wherein an axis of rotation of a milling cutter of said first and second milling cutter unit is normally parallel to said surface to-be-cut of said billet.

4. Billet milling equipment according to claim 1, wherein said means for automatically advancing and retreating includes means for reciprocably advancing and retreating said first and second milling cutter unit relative to said surface to-be-cut.

5. Billet milling equipment according to claim 1, wherein said means for automatically advancing and retreating include means for pivotably advancing and retreating said first and second milling cutter unit relative to said surface to-be-cut.

6. Billet milling equipment for cutting and removing a flaw by rotating a milling cutter in pressed contact with a surface to-be-cut of a billet, which comprises:
   first frames forming a traveling path through which said billet passes;
   a pair of upper and lower clamping frames which are moveable so as to follow up a deformation of said billet and which are installed on said first frames;
   a first and second milling cutter unit, which normally follow up the surface to-be-cut of said billet in correspondence with the deformation of said billet, installed on said upper and lower clamping frames, respectively, means for automatically advancing and retreating said first and second milling cutter unit relative to said surface to-be-cut wherein driving means for bestowing feed of said billet are installed on one of said clamping frames, and driven means pairing with and operably connected to said driving means is disposed on the side of said clamping frames and wherein said pair of upper and lower clamping frames are coupled with each other by cylinder members.

7. Billet milling equipment according to claim 6, wherein an axis of rotation of a milling cutter of said first and second milling cutter unit is normally perpendicular to said surface to-be-cut of said billet.

8. Billet milling equipment according to claim 6, wherein an axis of rotation of a milling cutter of said first and second milling cutter unit is normally parallel to said surface to-be-cut of said billet.

9. Billet milling equipment according to claim 6, wherein said means for automatically advancing and retreating includes means for reciprocably advancing and retreating said first and second milling cutter unit relative to said surface to-be-cut.

10. Billing milling equipment according to claim 6, wherein said means for automatically advancing and retreating include means for pivotably advancing and retreating said first and second milling cutter unit relative to said surface to-be-cut.

* * * * *